(12) United States Patent
Lee et al.

(10) Patent No.: US 9,036,013 B2
(45) Date of Patent: *May 19, 2015

(54) SEGMENTED DUAL LAYER PARALLAX BARRIER-BASED 3D DISPLAY DEVICE AND METHOD

(75) Inventors: Hyun Lee, Daejeon-si (KR); Eung Don Lee, Daejeon-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 361 days.

This patent is subject to a terminal disclaimer.

(21) Appl. No.: 13/527,125

(22) Filed: Jun. 19, 2012

(65) Prior Publication Data

US 2012/0320170 A1    Dec. 20, 2012

(30) Foreign Application Priority Data

Jun. 20, 2011  (KR) .................. 10-2011-0059807
Jun. 15, 2012  (KR) .................. 10-2012-0064281

(51) Int. Cl.
| | | |
|---|---|---|
| *H04N 13/04* | (2006.01) | |
| *G02F 1/13* | (2006.01) | |
| *G02B 27/22* | (2006.01) | |
| *G09G 3/00* | (2006.01) | |
| *G09G 3/36* | (2006.01) | |

(52) U.S. Cl.
CPC ........ *H04N 13/0409* (2013.01); *H04N 13/0475* (2013.01); *H04N 13/0477* (2013.01); *G02F 1/1323* (2013.01); *G02B 27/2214* (2013.01); *G09G 3/003* (2013.01); *G09G 3/3611* (2013.01)

(58) Field of Classification Search
None
See application file for complete search history.

(56) References Cited

U.S. PATENT DOCUMENTS

2007/0183015 A1* 8/2007 Jacobs et al. .............. 359/245
2008/0259232 A1* 10/2008 Kim et al. .................. 349/15

FOREIGN PATENT DOCUMENTS

| KR | 1020070023849 A | 3/2007 |
| KR | 1020120015259 A | 2/2012 |
| KR |   101057098 A | 6/2012 |

* cited by examiner

*Primary Examiner* — William C Vaughn, Jr.
*Assistant Examiner* — Jerry Jean Baptiste
(74) *Attorney, Agent, or Firm* — William Park & Associates Ltd.

(57) ABSTRACT

A segmented dual layer parallax barrier-based 3D display device may includes an image panel that displays a left image and a right image so as to alternately display a left-image column and a right-image column; a dual layer parallax barrier that includes a first common electrode, a second common electrode, a plurality of first individual electrodes, a plurality of second individual electrodes, a plurality of segmented electrodes, and a liquid crystal layer, and blocks specific portions of the displayed images; and a driving unit that drives the electrodes based on the distance between the image panel and the viewer so as to allow the viewer to view the left image and the right image, separately.

27 Claims, 6 Drawing Sheets

SEGMENTED DUAL LAYER PARALLAX BARRIER-BASED 3D DISPLAY DEVICE AND METHOD

PRIORITY CLAIM

The present application claims priority under 35 U.S.C 119(a) to Korean Application Nos. 10-2011-0059807, filed on Jun. 20, 2011, and 10-2012-0064281, filed on Jun. 15, 2012, in the Korean intellectual property Office, which are incorporated herein by reference in its entirety.

TECHNICAL FIELD

The present invention relates to a 3D display device and method, and more particularly, to a glassless 3D display device and method using a segmented dual layer parallax barrier, which provides different modes according to the distance between an observer and a screen.

BACKGROUND ART

Regarding a glassless 3D display method, Parallax Stereogram was proposed by F. E Ives of the United States in 1903. In Parallax Stereogram, a left image and a right image area alternately arranged at an appropriate distance on the rear surface of a parallax barrier to separate the left and right images and allow a viewer to view a stereoscopic image. More specifically, in the 3D display method using the parallax barrier, thin stripe vertical slits for transmitting or shielding light are arranged at regular intervals and left and right images are alternately disposed at the front or back of the slits by an appropriate interval, and as a result, the left and right images are geometric-optically split when the image is viewed through the slit at a predetermined point of time, thus causing the viewer to acquire the cubic effect. That is, a stripe parallax barrier optical plate serving as special glasses is installed in front of a monitor screen to allow the viewer to recognize the stereoscopic image without wearing the glasses.

However, the glassless 3D display method using the parallax barrier has a disadvantage that the viewing position is fixed. That is, the left and right images are split only when the observer is positioned at a specific distance from the screen, and hence the observer cannot view a 3D image if they move out of the viewing position. Accordingly, there was proposed a method that presents two modes using a dual layer parallax barrier in order to provide various viewing positions. The proposed method is disclosed in Korean Patent Unexamined Publication No. 10-2007-0023849, in which a barrier electrode is divided into a plurality of fine barrier electrodes, and the fine barrier electrodes are combined and driven according to positions of an observer to provide an optical viewing angle. However, this method has the disadvantage that crosstalk may be generated because part of light is transmitted through the gaps between the fine barrier electrodes, and this may result in lower 3D quality. Moreover, FPCs (Flexible Printed Circuits) become expensive, and it is difficult to perform bonding.

PRIOR ART DOCUMENTS

Patent Documents

Patent Document 1: Korean Patent Unexamined Publication No. 10-2007-0023849 titled "Optical Viewing Angle Stereoscopic Image Display" by NDIS Corporation (field on Mar. 2, 2007)

DISCLOSURE OF THE INVENTION

Problems to be Solved by the Invention

The present invention has been made in consideration of the above-mentioned circumstances. Accordingly, it is an object of the present invention to provide a dual layer parallax barrier-based 3D display device, which uses a dual layer parallax barrier, minimizes manufacturing costs by using segmented electrodes, and minimizes discontinuity occurring during movement between barriers, thereby reducing crosstalk and achieving a smooth glassless stereoscopic image according to viewing distance and position.

It is another object of the present invention to provide a dual layer parallax barrier-based 3D display method, which uses a dual layer parallax barrier, minimizes manufacturing costs by using segmented electrodes, and minimizes discontinuity occurring during movement between barriers, thereby reducing crosstalk and achieving a smooth glassless stereoscopic image according to viewing distance and position.

Means for Solving the Problems

To achieve the above-described objects of the present invention, there is provided a segmented dual layer parallax barrier-based 3D display device according an exemplary embodiment of the present invention, the 3D display device including: an image panel that displays a left image and a right image so as to alternately display a left-image column and a right-image column; a dual layer parallax barrier that includes a first common electrode, a second common electrode, a plurality of first individual electrodes, a plurality of second individual electrodes, a plurality of segmented electrodes, and a liquid crystal layer, and blocks specific portions of the displayed images; and a driving unit that drives the electrodes based on the distance between the image panel and the viewer so as to allow the viewer to view the left image and the right image, separately.

The segmented electrodes may include a first segmented electrode, a second segmented electrode, a third segmented electrode, and a fourth segmented electrode.

The dual layer parallax barrier may operate as Normally White in which the liquid crystal layer blocks light when a voltage is applied to the electrodes.

The dual layer parallax barrier may operate as Normally Black in which the liquid crystal layer transmits light when a voltage is applied to the electrodes.

The driving unit, in the first state, may apply a driving voltage between the second common electrode and the third segmented electrode, and apply a driving voltage between the second common electrode and the second individual electrodes.

The driving unit, in the second state, may apply a driving voltage between the second common electrode and the second segmented electrodes, and apply a driving voltage between the second common electrode and the fourth segmented electrodes.

The driving unit, in the third state, may apply a driving voltage between the first common electrode and the first segmented electrode, and apply a driving voltage between the first common electrode and the first individual electrodes.

The driving unit, in the fourth state, may apply a driving voltage between the first common electrode and the first individual electrodes, and apply a driving voltage between the first common electrode and the second segmented electrode.

The dual layer parallax barrier is characterized in that the first common electrode and the second common electrode are positioned on the outermost portions of opposite sides with respect to the liquid crystal layer, the plurality of first individual electrodes are positioned on the opposite side of the first common electrode with respect to the liquid crystal layer, and the plurality of second individual electrodes are positioned on the opposite side of the second common electrode with respect to the liquid crystal layer.

The dual layer parallax barrier is characterized in that the first segmented electrode is positioned at the left side of the first individual electrodes, the second segmented electrode is positioned at the right side of the first individual electrodes, the third segmented electrode is positioned at the left side of the second individual electrodes, and the fourth segmented electrode is positioned at the right side of the second individual electrodes.

To achieve the above-described objects of the present invention, there is provided a segmented dual layer parallax barrier-based 3D display method according an exemplary embodiment of the present invention, the method including: displaying a left image and a right image so as to alternately display a left-image column and a right-image column; driving the electrodes of a dual layer parallax barrier based on the distance between the image panel and the viewer so as to allow the viewer to view the left image and the right image, separately; blocking specific portions of the displayed image under the control of the driving unit by the dual layer parallax barrier that includes a first common electrode, a second common electrode, a plurality of first individual electrodes, a plurality of second individual electrodes, a plurality of segmented electrodes, and a liquid crystal layer.

The segmented electrodes may include a first segmented electrode, a second segmented electrode, a third segmented electrode, and a fourth segmented electrode.

The dual layer parallax barrier may operate as Normally White in which the liquid crystal layer blocks light when a voltage is applied to the electrodes.

The dual layer parallax barrier may operate as Normally Black in which the liquid crystal layer transmits light when a voltage is applied to the electrodes.

In the driving of the electrodes, in the first state, a driving voltage may be applied between the second common electrode and the third segmented electrode, and a driving voltage may be applied between the second common electrode and the second individual electrodes.

In the driving of the electrodes, in the second state, a driving voltage may be applied between the second common electrode and the second segmented electrodes, and a driving voltage may be applied between the second common electrode and the fourth segmented electrodes.

In the driving of the electrodes, in the third state, a driving voltage may be applied between the first common electrode and the first segmented electrode, and a driving voltage may be applied between the first common electrode and the first individual electrodes.

In the driving of the electrodes, in the fourth state, a driving voltage may be applied between the first common electrode and the first individual electrodes, and a driving voltage may be applied between the first common electrode and the second segmented electrode.

The dual layer parallax barrier is characterized in that the first common electrode and the second common electrode are positioned on the outermost portions of opposite sides with respect to the liquid crystal layer, the plurality of first individual electrodes are positioned on the opposite side of the first common electrode with respect to the liquid crystal layer, and the plurality of second individual electrodes are positioned on the opposite side of the second common electrode with respect to the liquid crystal layer.

The dual layer parallax barrier is characterized in that the first segmented electrode is positioned at the left side of the first individual electrodes, the second segmented electrode is positioned at the right side of the first individual electrodes, the third segmented electrode is positioned at the left side of the second individual electrodes, and the fourth segmented electrode is positioned at the right side of the second individual electrodes.

Advantageous Effect

According to the above-stated dual layer parallax barrier-based 3D display device and method according to an exemplary embodiment of the present invention, a dual layer parallax barrier and segmented electrodes are used to provide four types of state transitions, which is two more than the two types of state transitions provided in a conventional dual layer parallax barrier-based 3D display device and method.

Accordingly, the dual layer parallax barrier operates so as to correspond to relevant states according to viewing distance and position without a significant increase in manufacturing costs, and this minimizes discontinuity occurring during movement between barriers, thereby reducing crosstalk and achieving a natural and continuous glassless stereoscopic image.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Figure 1:
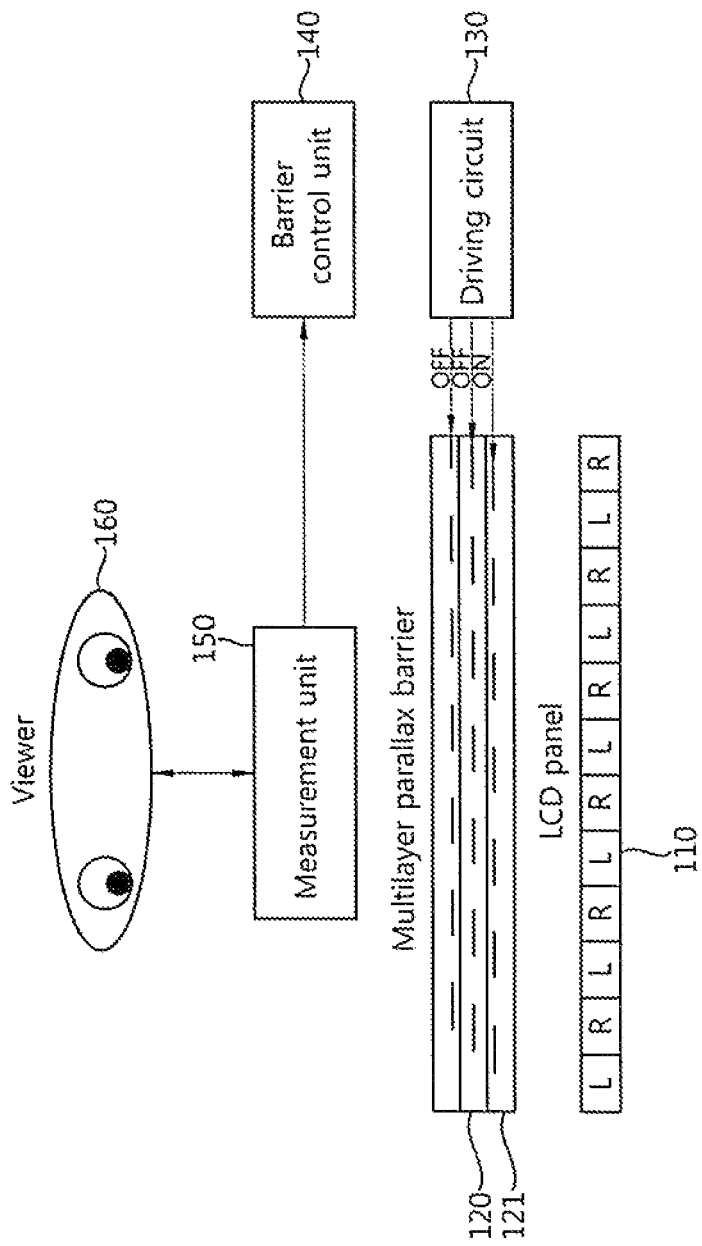
FIG. 1 is as block diagram showing the configuration of a multilayer parallax barrier-based 3D display device.

The present invention may be variably modified and may have various embodiments, particular examples of which will be illustrated in drawings and described in detail.

However, the present invention is not limited to the specific embodiments and should be construed as including all the changes, equivalents, and substitutions included in the spirit and scope of the present invention.

In the description of the embodiments of the present specification, if detailed descriptions of related well-known constructions or functions are determined to make the gist of the present invention unclear, the detailed descriptions will be omitted.

Terms such as 'first, 'second', etc. can be used to describe various components, but the components are not limited to the terms. Terms described in the specification are used to discriminate one component from other components. For example, the first component may be called the second component without departing from the scope of the present invention. Likewise, the second component may be called the first component. The term "and/or" includes a combination of a plurality of related and described items or any one of a plurality of related and described items.

When any components are "connected" or "coupled" to other components, it is to be understood that the components may be directly connected or coupled to other components, but there is another component therebetween. On the other hand, when any components are "directly connected" or "directly coupled" to other components, it is to be understood that there is no other component therebetween.

The terms used in the present application are merely used to describe a particular exemplary embodiment, and are not intended to limit the inventive concept. Use of singular forms includes plural references as well unless expressly specified otherwise. The terms "comprising", "including", and "having" specify the presence of stated features, numbers, steps, operations, elements, parts, and/or a combination thereof but do not preclude the presence or addition of one or more other features, numbers, steps, operations, elements, parts, and/or a combination thereof.

Components shown in embodiments of the present invention are independently illustrated to represent different characteristic functions, and such illustration shall not imply that each component includes a separate hardware or software component. Namely, each component comprises an array of individual components for convenience of description. A combination of at least two of the individual components may comprise a single component, or a single component may be divided into a plurality of components to perform the functions. All combined or separate implementations of these components are contemplated as falling within the scope of the invention unless departing from the essential characteristics of the present invention.

Unless otherwise defined, all terms used herein, including technical or scientific terms, have the same meanings as those generally understood by those with ordinary knowledge in the field of art to which the present invention belongs. Such terms as those defined in a generally used dictionary are to be interpreted to have the meanings equal to the contextual meanings in the relevant field of art, and are not to be interpreted to have ideal or excessively formal meanings unless clearly defined in the present application.

Exemplary embodiments of the present invention will be described below in more detail with reference to the accompanying drawings. In order to facilitate an overall understanding in describing the present invention, the same elements in the drawings are referred to by the same reference numerals, and redundant descriptions of the same elements will be omitted.

FIG. 1 is as block diagram showing the configuration of a multilayer parallax barrier-based 3D display device.

As shown in FIG. 1, the conventional multilayer parallax barrier-based 3D display device controls the viewing distance and viewing angle of a glassless 3D display by bonding a multilayer parallax barrier 120 onto an LCD panel 110 and driving only the barrier 121 corresponding to the viewing distance of a viewer 160 and turning off the remaining barriers.

As shown in FIG. 1, the multilayer parallax barrier-based 3D display device may include a measurement unit 150 for measuring the distance between the viewer 160 and the display, the lateral position of the viewer 160 with respect to the display, and tilting of the face, a barrier control unit 140 for selecting and controlling a target parallax barrier by using a measured signal, a driving circuit 130 for driving the barrier according to a signal from the barrier control unit 140, a multilayer parallax barrier 120, and an LCD panel 110. The measurement unit 150 may employ a measurement sensor and a camera in order to measure the distance and lateral position of the display with respect to the viewer. The measurement sensor and the camera may include typical sensors and cameras, including an IR sensor, an ultrasonic sensor, a laser sensor, a 2D camera, a stereocamera, etc. The barrier control unit 140 selects a target parallax barrier 121 from the multilayer parallax barrier 120 using position information of the viewer received from the measurement unit 150, such as distance, lateral position, etc. according to a barrier design method. The driving circuit 130 drives on the selected barrier 121 to turn it on and turn the remaining barriers off.

However, the multilayer parallax barrier-based 3D display device requires a multiple parallax barrier in order to continuously control the operation of the 3D display according to a change in the position of the user with respect to the display, and this makes the manufacturing difficult and incurs high cost.

Figure 2:
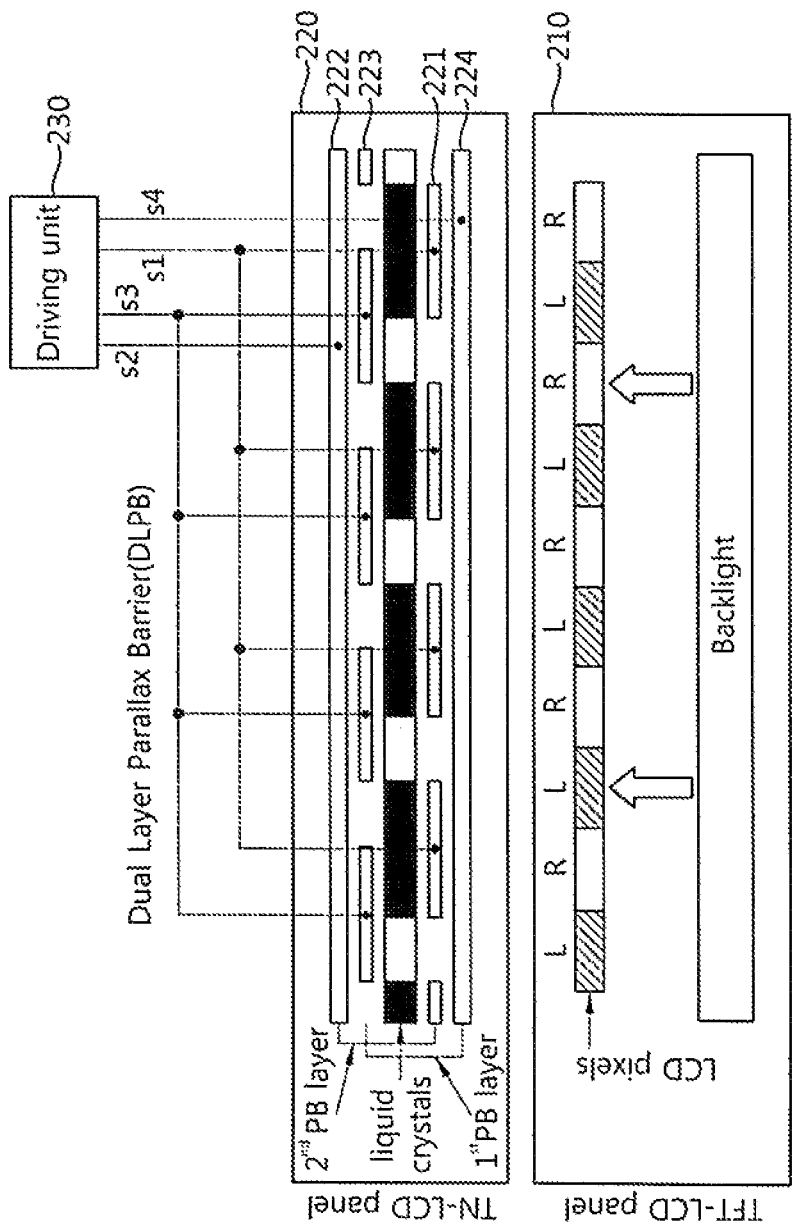
FIG. 2 is a block diagram of a 3D display device based on a dual layer parallax barrier according to the conventional art.

FIG. 2 is a block diagram of a 3D display device based on a dual layer parallax barrier according to the conventional art. That is, FIG. 2 depicts a structure for realizing a glassless 3D display using a dual layer parallax barrier (DLPB), which is one of multilayer parallax barrier methods.

As shown in FIG. 2, a TFT-LCD 210 may be a typical display for reproducing an image in units of pixels, and a TN-LCD 220 constitutes a parallax barrier to separate light transmitted through the left and right eyes. As shown in FIG. 2, the double layer parallax barrier 220 may include a first parallax barrier layer (1st PB layer) 223 and 224 and a second parallax barrier (2nd PB layer). Each layer consists of two pairs of transparent electrodes made of indium tin oxide (ITO) and is applied with a driving voltage.

Light actually generated from the TFT-LCD 210 by reproducing a 3D image is blocked or transmitted by liquid crystals of the TN-LCD 220. The TN-LCD 220 may operate as Normally Black in which liquid crystals transmit light when a voltage having a predetermined level is applied to the transparent electrodes (and otherwise blocks light when no voltage is applied) and Normally White in which liquid crystals transmit light when no voltage is applied (and otherwise blocks light when a voltage is applied). As shown in FIG. 2, a driving unit 230 is a circuit for providing a driving voltage to two layers of parallax barriers based on the position and distance of the viewer, which is connected to the transparent electrodes 221, 222, 223, and 224 by electrodes s1, s2, s3, and s4.

Figure 3:
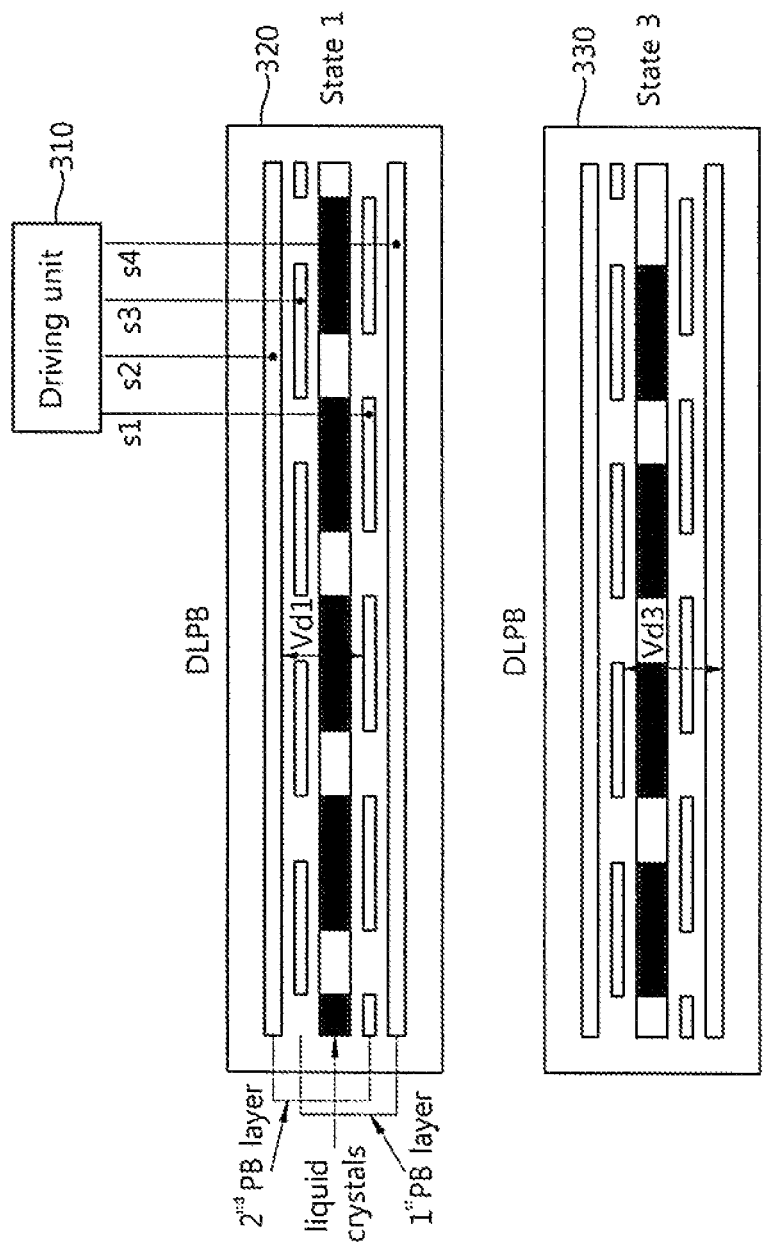
FIG. 3 shows the state of the dual layer parallax barrier of FIG. 2 according to a driving voltage applied according to the conventional art.

FIG. 3 shows the state of the dual layer parallax barrier of FIG. 2 according to a driving voltage applied according to the conventional art. The dual layer parallax barrier of FIG. 3 shows the state transition of the dual layer parallax barrier according to a driving voltage applied by the driving unit 310, in the case of Normally White liquid crystals transmit light when no voltage is applied (and otherwise blocks light when a voltage is applied).

The voltages applied in the first state (state 1) 320 and the third state (state 3) 330 are as in the following Table 1.

TABLE 1

| DLPB operating state | Driving Circuit Operation |
|---|---|
| State 1 | s1-s2: apply driving voltage Vd1 |
| State 3 | s3-s4: apply driving voltage Vd3 |

The first state (state 1) 320 is formed when the driving unit 310 applies a driving voltage Vd1 having a predetermined level and frequency between the electrode s1 and the electrode s2. That is, the first state (state 1) 320 indicates the operation of the second parallax barrier layer 221 and 222. The third state (state 3) 330 is formed when the driving unit 310 applies a driving voltage Vd3 having a predetermined level and frequency between the electrode s3 and the electrode s4. That is, the third state (state 3) 330 indicates the operation of the first parallax barrier layer 223 and 224.

The above-described conventional dual layer parallax barrier-based 3D display device has only two types of state transition including the first state and the third state, even if the dual layer parallax barrier operates by the operation of the driving circuit according to the viewer's position and viewing distance. Hence, the viewer has no choice but to view a discontinuous stereoscopic image according to position and viewing distance. That is, there is a disadvantage that the viewer can view a stereoscopic image only at a specific position and a viewing distance.

Figure 4:
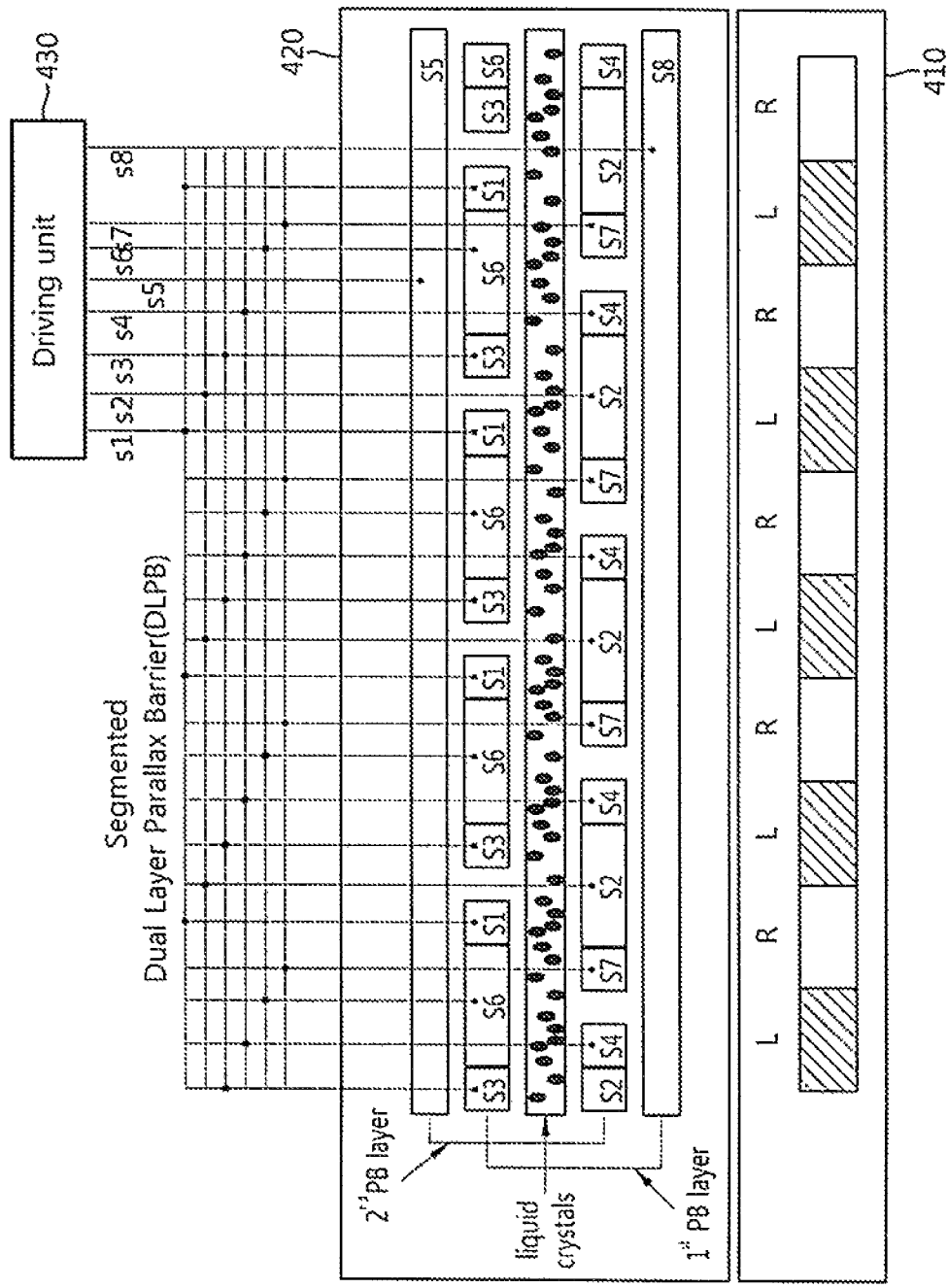
FIG. 4 is a block diagram of a segmented dual layer parallax barrier-based 3D display device according to an exemplary embodiment of the present invention.

FIG. 4 is a block diagram of a segmented dual layer parallax barrier-based 3D display device according to an exemplary embodiment of the present invention. The segmented dual layer parallax barrier-based 3D display device according to an exemplary embodiment of the present invention may make use of a segmented dual layer parallax barrier in order to provide a more continuous glassless stereoscopic image according to a change in the viewer's position or viewing distance by increasing the number of operating states of the dual layer parallax barrier.

As shown in FIG. 4, the segmented dual layer parallax barrier-based 3D display device according to an exemplary embodiment of the present invention includes an image panel 410, a dual layer parallax barrier 420, and a driving unit 430.

The image panel 410 may display a left image and a right image so as to alternately display a left-image column and a right-image column. As shown in FIG. 4, a left image and a right image can be simultaneously displayed on an image panel by alternately displaying a left-image column L and a right-image column R.

The image panel 410 may be one of the following: a liquid crystal display LCD, a light emitting diode display LED, an organic light emitting diode display OLED, a plasma display panel PDP, and an electroluminescent display (EL). That is, the image panel 410 refers, but not limited, to a general display device for reproducing an image in units of pixels.

Although the parallax barrier 420 may consist of two layers like the conventional parallax barrier, a transparent electrode may be divided into a wider variety of types and connected to a corresponding number of electrodes. That is, the dual layer parallax barrier 420 may include a first common electrode s8, a second common electrode s5, a plurality of first individual electrodes s6, a plurality of second individual electrodes s2, a plurality of segmented electrodes, and a liquid crystal layer 425. The segmented electrodes may include a first segmented electrode s3, a second segmented electrode s1, a third segmented electrode s7, and a fourth segmented electrode s4. However, the segmented electrodes are not necessarily restricted to these four types, but may vary in the number of types. In this specification, the description will be made on an example in which the segmented electrodes come in four types including the first segmented electrode s3 through the fourth segmented electrode s4.

The dual layer parallax barrier 420 can block a specific part of an image displayed by the image panel 410 based on the electrodes and liquid crystal layer.

More specifically, the left image and right image reproduced by the image panel 410 are properly blocked by the dual layer parallax barrier 420 controlled by the driving unit 430 based on the viewer's position and distance with respect to the screen so that both eyes of the viewer can view only the left image and the right image, separately. Accordingly, the viewer can view a 3D image.

The dual layer parallax barrier 420 may be characterized in that it operates as Normally White in which the liquid crystal layer 425 blocks light when a voltage is applied to the transparent electrodes (and otherwise transmits light when no voltage is applied), or it operates as Normally Black in which the liquid crystal layer 425 transmits light when a voltage is applied to the transparent electrodes (and otherwise blocks light when no voltage is applied). The above-mentioned characteristic can be determined according to the type of liquid crystals used for the liquid crystal layer 425. The above-mentioned characteristics of liquid crystals should be taken into account in order to properly control the parallax barrier 420 in consideration of the viewer's distance and position with respect to the screen.

Meanwhile, as shown in FIG. 4, the dual layer parallax barrier 420 is characterized in that the first common electrode s8 and the second common electrode s5 are positioned on the outermost portions of opposite sides with respect to the liquid crystal layer 425, the plurality of first individual electrodes s6 are positioned on the opposite side of the first common electrode s8 with respect to the liquid crystal layer 425, and the plurality of second individual electrodes s2 are positioned on the opposite side of the second common electrode s5 with respect to the liquid crystal layer 425.

The dual layer parallax barrier 420 is characterized in that the first segmented electrode s3 is positioned at the left side of the first individual electrodes s6, the second segmented electrode s1 is positioned at the right side of the first individual electrodes s6, the third segmented s7 is positioned at the left side of the second individual electrodes s2, and the fourth segmented electrode s4 is positioned at the right side of the second individual electrodes s2.

The driving unit 430 can drive the electrodes based on the distance between the image panel 410 and the viewer so as to allow the viewer to view a left image and a right image, separately. While the conventional dual layer parallax barrier-based 3D display device is capable of driving either the first parallax barrier or the second parallax barrier, the segmented dual layer parallax barrier-based 3D display device according to an exemplary embodiment of the present invention can simultaneously drive part of the common electrodes, individual electrodes, and segmented electrodes, thereby generating four types of state transitions.

Figure 5:
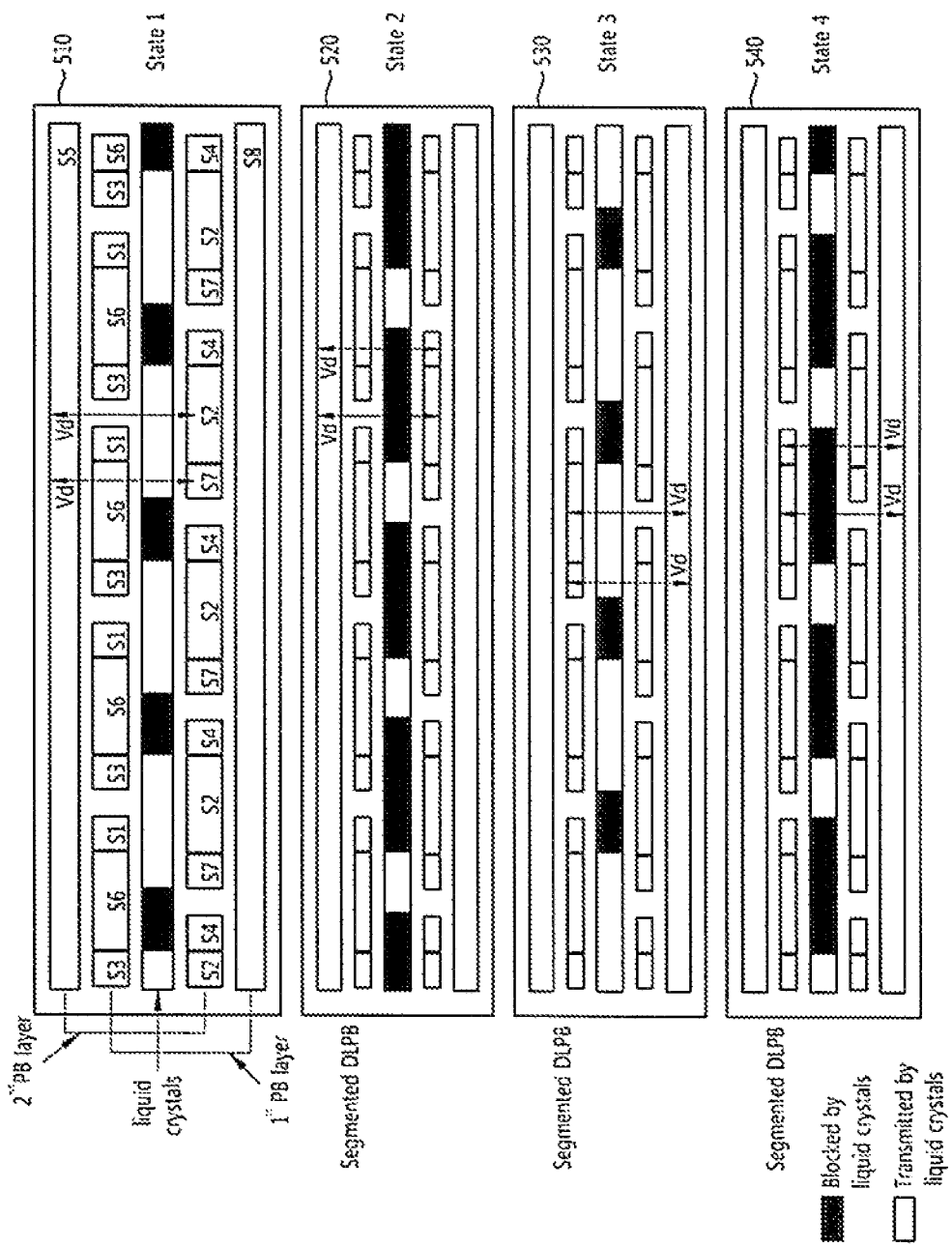
FIG. 5 shows the state of the segmented dual layer parallax barrier of FIG. 4 according to a driving voltage applied according to an exemplar embodiment of the present invention, in the case that the method of transmitting light by liquid crystals when no voltage is applied is employed.

FIG. 5 shows the state of the dual layer parallax barrier of FIG. 4 according to a driving voltage applied according to an exemplar embodiment of the present invention, in the case that the method of transmitting light by liquid crystals when no voltage is applied is employed.

In the case of Normally White in which Normally White in which liquid crystals transmit light when no voltage is applied (and otherwise blocks light when a voltage is applied), a total of four types of operating state transitions can occur, as shown in FIG. 5, according to a driving voltage applied according to an exemplary embodiment of the present invention. The driving electrodes corresponding to the first state (state 1) 510, the second state (state 2) 520, the third state (state 3) 530, and the fourth state (state 4) 540 are as shown in the following Table 2.

TABLE 2

| DLPB operating state | Driving Circuit Operation |
| --- | --- |
| State 1 | s7-s5, s2-s5: apply driving voltage Vd |
| State 2 | s2-s5, s4-s5: apply driving voltage Vd |
| State 3 | s6-s8, s3-s8: apply driving voltage Vd |
| State 4 | s6-s8, s1-s8: apply driving voltage Vd |

The first state (state 1) 510 occurs formed when the driving unit 430 applies a driving voltage between the second common electrode s5 and the third segmented electrode s7 and applies a driving voltage between the second common electrode s5 and the second individual electrode s2.

The second state (state 2) 520 occurs when the driving unit 430 applies a driving voltage between the second common electrode s5 and the second individual electrode s2 and applies a driving voltage between the second common electrode s5 and the fourth segmented electrode s4.

The third state (state 3) 530 occurs when the driving unit 430 applies a driving voltage between the first common electrode s8 and the first segmented electrode s3 and applies a driving voltage between the first common electrode s8 and the first individual electrodes s6.

The fourth state (state 4) 540 occurs when the driving unit 430 applies a driving voltage between the first common electrode s8 and the first individual electrodes s6 and applies a driving voltage between the first common electrode s8 and the second segmented electrode s1.

As seen from above, a total of four types of state transitions may be induced by applying a driving voltage to part of the common electrodes, individual electrodes, and segmented electrodes, and therefore various state transitions may occur compared to the conventional dual layer parallax barrier-based 3D display device, only with the addition of segmented electrodes. Accordingly, the viewer can view a 3D image which is more continuous and not restricted by position and distance, without additional costs.

Meanwhile, in the case of Normally black as well in which liquid crystals block light when no voltage is applied (and otherwise transmit light when a voltage is applied), four types of state transitions may occur by properly driving part of the common electrodes, individual electrodes, and segmented electrodes.

Figure 6:
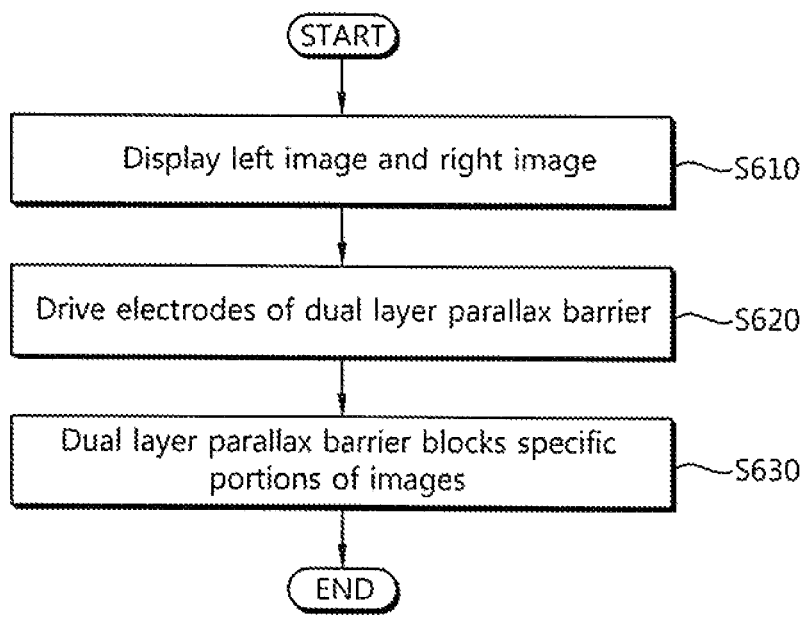
FIG. 6 is a flowchart of a segmented dual layer parallax barrier-based 3D display method according to an exemplary embodiment of the present invention.

FIG. 6 is a flowchart of a segmented dual layer parallax barrier-based 3D display method according to an exemplary embodiment of the present invention.

As shown in FIG. 6, in the segmented dual layer parallax barrier-based 3D display method according to an exemplary embodiment of the present invention, an image panel may display a left image and a right image so as to alternately display a left-image column and a right-image column (S610). The image panel may be one of the following: a liquid crystal display LCD, a light emitting diode display LED, an organic light emitting diode display OLED, a plasma display panel PDP, and an electroluminescent display (EL). That is, the image panel refers, but not limited, to a general display device for reproducing an image in units of pixels.

Afterwards, a driving unit may drive electrodes of a dual layer parallax barrier based on the distance between the image panel and the viewer so that the viewer can view the left image and the right image, separately (S620). The dual layer parallax barrier may include a first common electrode, a second common electrode, a plurality of first individual electrodes, a plurality of second individual electrodes, a plurality of segmented electrodes, and a liquid crystal layer. The segmented electrodes may include a first segmented electrode, a second segmented electrode, a third segmented electrode, and a fourth segmented electrode.

The dual layer parallax barrier is characterized in that the first common electrode and the second common electrode are positioned on the outermost portions of opposite sides with respect to the liquid crystal layer, the plurality of first individual electrodes are positioned on the opposite side of the first common electrode with respect to the liquid crystal layer, and the plurality of second individual electrodes are positioned on the opposite side of the second common electrode with respect to the liquid crystal layer.

The dual layer parallax barrier is characterized in that the first segmented electrode is positioned at the left side of the first individual electrodes, the second segmented electrode is positioned at the right side of the first individual electrodes, the third segmented electrode is positioned at the left side of the second individual electrodes, and the fourth segmented electrode is positioned at the right side of the second individual electrodes.

The dual layer parallax barrier may operate as Normally White in which the liquid crystal layer blocks light when a voltage is applied to the electrodes. When it operates as Normally White, the step S620 of operating the electrodes involves, in the first state, applying a driving voltage between the second common electrode and the third segmented electrode, and applying a driving voltage between the second common electrode and the second individual electrodes.

When it operates as Normally White, the step S620 of operating the electrodes involves, in the second state, applying a driving voltage between the second common electrode and the second individual electrodes, and applying a driving voltage between the second common electrode and the fourth segmented electrode.

When it operates as Normally White, the step S620 of operating the electrodes involves, in the third state, applying a driving voltage between the first common electrode and the first segmented electrode, and applying a driving voltage between the first common electrode and the first individual electrodes.

When it operates as Normally White, the step S620 of operating the electrodes involves, in the fourth state, applying a driving voltage between the first common electrode and the first individual electrodes, and applying a driving voltage between the first common electrode and the second segmented electrode.

Meanwhile, in the case of Normally black as well in which liquid crystals block light when no voltage is applied (and otherwise transmit light when a voltage is applied), four types of state transitions may occur by properly driving part of the common electrodes, individual electrodes, and segmented electrodes.

When the electrodes are driven according to the control of the driving unit, the dual layer parallax barrier including the first common electrode, the second common electrode, the plurality of first individual electrodes, the plurality of second individual electrodes, the plurality of segmented electrodes, and the liquid crystal layer blocks specific portions of the displayed images (S630), and this allows the viewer to view the left image and the right image, separately, thereby viewing a 3D image.

Concrete characteristics of the segmented dual layer parallax barrier-based 3D display according to an exemplary embodiment of the present invention are based on the above-described segmented dual parallax barrier-based 3D display according to an exemplary embodiment of the present invention.

What is claimed is:

1. A segmented dual layer parallax barrier-based 3D display device, the 3D display device comprising: an image panel configured to display a left image and a right image so as to alternately display a left-image column and a right-image column;
   a dual layer parallax barrier configured to block specific portions of the displayed images, the dual layer parallax barrier including a first common electrode, a second common electrode, a first layer of first individual electrodes, a second layer of second individual electrodes, a plurality of segmented electrodes, and a liquid crystal layer;
   the segmented electrodes being positioned in the first layer at left and right sides of the first individual electrodes and in the second layer at left and right sides of the second individual electrodes; and
   a driving unit drives configured to drive the electrodes based on a distance between the image panel and a viewer so as to allow the viewer to view the left image and the right image, separately.

2. The segmented dual layer parallax barrier-based 3D display device of claim 1, wherein the segmented electrodes comprise a first segmented electrode, a second segmented electrode, a third segmented electrode, and a fourth segmented electrode.

3. The segmented dual layer parallax barrier-based 3D display device of claim 2, wherein the dual layer parallax barrier operates as Normally White in which the liquid crystal layer blocks light when a voltage is applied to the electrodes.

4. The segmented dual layer parallax barrier-based 3D display device of claim 1, wherein the dual layer parallax barrier operates as Normally Black in which the liquid crystal layer transmits light when a voltage is applied to the electrodes.

5. The segmented dual layer parallax barrier-based 3D display device of claim 3, wherein the driving unit, in a first state, applies a driving voltage between the second common electrode and the third segmented electrode, and applies a driving voltage between the second common electrode and the second individual electrodes.

6. The segmented dual layer parallax barrier-based 3D display device of claim 3, wherein the driving unit, in a second state, applies a driving voltage between the second common electrode and the second individual electrodes, and applies a driving voltage between the second common electrode and the fourth segmented electrodes.

7. The segmented dual layer parallax barrier-based 3D display device of claim 3, wherein the driving unit, in a third state, applies a driving voltage between the first common electrode and the first segmented electrode, and applies a driving voltage between the first common electrode and the first individual electrodes.

8. The segmented dual layer parallax barrier-based 3D display device of claim 3, wherein the driving unit, in a fourth state, applies a driving voltage between the first common electrode and the first individual electrodes, and applies a driving voltage between the first common electrode and the second segmented electrode.

9. The segmented dual layer parallax barrier-based 3D display device of claim 2, wherein the first common electrode and the second common electrode are positioned on the outermost portions of opposite sides with respect to the liquid crystal layer, the first individual electrodes are positioned on the opposite side of the first common electrode with respect to the liquid crystal layer, and the second individual electrodes are positioned on the opposite side of the second common electrode with respect to the liquid crystal layer.

10. The segmented dual layer parallax barrier-based 3D display device of claim 9, wherein the first segmented electrode is positioned at the left side of the first individual electrodes, the second segmented electrode is positioned at the right side of the first individual electrodes, the third segmented electrode is positioned at the left side of the second individual electrodes, and the fourth segmented electrode is positioned at the right side of the second individual electrodes.

11. A segmented dual layer parallax barrier-based 3D display method, the method comprising:
   displaying a left image and a right image so as to alternately display a left-image column and a right-image column;
   driving electrodes of a dual layer parallax barrier based on a distance between an image panel and a viewer so as to allow the viewer to view the left image and the right image, separately;
   blocking, by the dual layer parallax barrier, specific portions of the displayed image under control of the driving, the dual layer parallax barrier including a first common electrode, a second common electrode, a first layer of individual electrodes, a second layer of second individual electrodes, a plurality of segmented electrodes, and a liquid crystal layer, the segmented electrodes being positioned in the first layer at left and right sides of the first individual electrodes and in the second layer at the left and right sides of the second individual electrodes.

12. The method of claim 11, wherein the segmented electrodes comprise a first segmented electrode, a second segmented electrode, a third segmented electrode, and a fourth segmented electrode.

13. The method of claim 12, wherein the dual layer parallax barrier operates as Normally White in which the liquid crystal layer blocks light when a voltage is applied to the electrodes.

14. The method of claim 11, wherein dual layer parallax barrier operates as Normally Black in which the liquid crystal layer transmits light when a voltage is applied to the electrodes.

15. The method of claim 11, wherein, in the driving of the electrodes, in a first state, a driving voltage is applied between the second common electrode and the third segmented electrode, and a driving voltage is applied between the second common electrode and the second individual electrodes.

16. The method of claim 13, wherein, in the driving of the electrodes, in a second state, a driving voltage is applied between the second common electrode and the second individual electrodes, and a driving voltage is applied between the second common electrode and the fourth segmented electrodes.

17. The method of claim 13, wherein, in the driving of the electrodes, in a third state, a driving voltage is applied between the first common electrode and the first segmented electrode, and a driving voltage is applied between the first common electrode and the first individual electrodes.

18. The method of claim 13, wherein, in the driving of the electrodes, in the fourth state, a driving voltage is applied between the first common electrode and the first individual electrodes, and a driving voltage is applied between the first common electrode and the second segmented electrode.

19. The method of claim 11, wherein the first common electrode and the second common electrode are positioned on the outermost portions of opposite sides with respect to the liquid crystal layer, the first individual electrodes are positioned on the opposite side of the first common electrode with respect to the liquid crystal layer, and the second individual electrodes are positioned on the opposite side of the second common electrode with respect to the liquid crystal layer.

20. The method of claim 19, wherein the first segmented electrode is positioned at the left side of the first individual electrodes, the second segmented electrode is positioned at the right side of the first individual electrodes, the third segmented electrode is positioned at the left side of the second individual electrodes, and the fourth segmented electrode is positioned at the right side of the second individual electrodes.

21. A segmented dual layer parallax barrier-based 3D display device, the 3D display device comprising:
   an image panel configured to display a left image and a right image so as to alternately display a left-image column and a right-image column;
   a dual layer parallax barrier configured to block specific portions of the displayed images, the dual layer parallax barrier including a first common electrode, a second common electrode, a plurality of first individual electrodes, a plurality of second individual electrodes, a plurality of segmented electrodes, and a liquid crystal layer; and
   a driving unit configured to drive the electrodes based on a distance between the image panel and a viewer to view the left image and the right image, separately,
   wherein the first common electrode and the second common electrode are positioned on the outermost portions of opposite sides with respect to the liquid crystal layer, the plurality of first individual electrodes are positioned on the opposite side of the first common electrode with respect to the liquid crystal layer, and the plurality of second individual electrodes are positioned on the opposite side of the second common electrode with respect to the liquid crystal layer, and
   wherein the plurality of segmented electrodes comprise a first segmented electrode positioned at the left side of the first individual electrodes, a second segmented electrode positioned at the right side of the first individual electrodes, a third segmented electrode positioned at the left side of the second individual electrodes, and a fourth segmented electrode positioned at the right side of the second individual electrodes.

22. The segmented dual layer parallax barrier-based 3D display device of claim 21, wherein the dual layer parallax barrier operates as Normally White in which the liquid crystal layer blocks light when a voltage is applied to the electrodes.

23. The segmented dual layer parallax barrier-based 3D display device of claim 21, wherein the dual layer parallax barrier operates as Normally Black in which the liquid crystal layer transmit light when a voltage is applied to the electrodes.

24. The segmented dual layer parallax barrier-based 3D display device of claim 21, wherein the driving unit, in a first state, applies a driving voltage between the second common electrode and the third segmented electrode, and applies a driving voltage between the second common electrode and the second individual electrodes.

25. The segmented dual layer parallax barrier-based 3D display device of claim 24, wherein the driving unit, in a second state, applies a driving voltage between the second common electrode and the second individual electrodes, and applies a driving voltage between the second common electrode and the fourth segmented electrodes.

26. The segmented dual layer parallax barrier-based 3D display device of claim 25, wherein the driving unit, in a third state, applies a driving voltage between the first common electrode and the first segmented electrode, and applies a driving voltage between the first common electrode and the first individual electrodes.

27. The segmented dual layer parallax barrier-based 3D display device of claim 26, wherein the driving unit, in a fourth state, applies a driving voltage between the first common electrode and the first individual electrodes, and applies a driving voltage between the first common electrode and the second segmented electrode.

* * * * *